United States Patent
Sato

(10) Patent No.: US 9,456,191 B2
(45) Date of Patent: Sep. 27, 2016

(54) REPRODUCTION APPARATUS AND REPRODUCTION METHOD

(71) Applicant: CANON KABUSHIKI KAISHA, Tokyo (JP)

(72) Inventor: Haruko Sato, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 13/783,951

(22) Filed: Mar. 4, 2013

(65) Prior Publication Data

US 2013/0236165 A1 Sep. 12, 2013

(30) Foreign Application Priority Data

Mar. 9, 2012 (JP) .................................. 2012-053604

(51) Int. Cl.

| H04N 9/87 | (2006.01) |
|---|---|
| H04N 5/77 | (2006.01) |
| H04N 9/79 | (2006.01) |
| H04N 9/82 | (2006.01) |
| G11B 27/034 | (2006.01) |
| G11B 27/32 | (2006.01) |
| G11B 27/031 | (2006.01) |

(52) U.S. Cl.
CPC ................ *H04N 9/87* (2013.01); *G11B 27/031* (2013.01); *G11B 27/034* (2013.01); *G11B 27/322* (2013.01); *H04N 5/772* (2013.01); *H04N 9/7921* (2013.01); *H04N 9/8205* (2013.01)

(58) Field of Classification Search
CPC ...... H04N 9/87; H04N 5/772; H04N 9/7921; H04N 9/8205; G11B 27/034; G11B 27/322; G11B 27/031

USPC .................................................. 386/278–290
See application file for complete search history.

(56) References Cited

U.S. PATENT DOCUMENTS

| 7,227,971 B2 | 6/2007 | Nagao |
| 7,536,027 B2 | 5/2009 | Nagao |
| 7,986,867 B2 * | 7/2011 | Gavin et al. .................. 386/278 |

(Continued)

FOREIGN PATENT DOCUMENTS

| JP | 2001-069487 A | 3/2001 |
| JP | 2002-351878 A | 12/2002 |

(Continued)

OTHER PUBLICATIONS

Japanese Office Action issued in counterpart Japanese Patent Application No. 2012-053604, dated Oct. 6, 2015.

*Primary Examiner* — Gelek W Topgyal
(74) *Attorney, Agent, or Firm* — Fitzpatrick, Cella, Harper & Scinto

(57) ABSTRACT

A reproduction apparatus, which is provided to reproduce a moving image recorded in a recording apparatus, includes: a storage unit configured to store change information indicating a change of a position of a scene included in the moving image recorded in the recording apparatus; a receiving unit configured to receive start information designating a reproduction start position of the moving image based on a reference position of the moving image before the change of the position of the scene; and an identifying unit configured to identify the distance from the reference position to the reproduction start position changed by the change of the position of the scene, on the basis of the change information and the start information received by the receiving unit.

17 Claims, 13 Drawing Sheets

(56) References Cited

U.S. PATENT DOCUMENTS

| | | |
|---|---|---|
| 8,719,880 B2 | 5/2014 | Nakamura et al. |
| 2002/0024999 A1* | 2/2002 | Yamaguchi et al. ..... 375/240.03 |
| 2002/0194480 A1 | 12/2002 | Nagao |
| 2007/0248241 A1 | 10/2007 | Nagao |
| 2007/0248325 A1* | 10/2007 | Tanaka et al. .................. 386/95 |
| 2008/0013915 A1* | 1/2008 | Gill et al. ........................ 386/52 |
| 2009/0060449 A1* | 3/2009 | Shinkai et al. .................. 386/46 |
| 2009/0232470 A1* | 9/2009 | Uchida .................. H04N 19/40 386/283 |
| 2010/0067866 A1* | 3/2010 | Park et al. ....................... 386/52 |
| 2012/0117603 A1 | 5/2012 | Nakamura et al. |
| 2013/0036201 A1* | 2/2013 | McLaughlin ...... H04N 21/2393 709/219 |

FOREIGN PATENT DOCUMENTS

| | | |
|---|---|---|
| JP | 2003-189276 A | 7/2003 |
| JP | 2006-013792 A | 1/2006 |
| WO | 2011-155141 A1 | 12/2011 |

\* cited by examiner

FIG. 3A

| VERSION NUMBER | EDITING HISTORY |
|---|---|
| 1 | SCENE SEQUENCE OF SCENES A, B, C, D, E (ORIGINAL STATE) |
| 2 | PLACE SCENE C AT THE HEAD |
| 3 | PLACE SCENE D BEFORE SCENE B |
| ... | ... |
| 28 | PLACE SCENE B AT THE END |

FIG. 3B

| EDITING DATE AND TIME | EDITING HISTORY |
|---|---|
| ... | ... |
| 06/28/20xx | MOVE SCENE C PLACED AFTER SCENE B |
| 07/04/20xx | MOVE SCENE D PLACED AFTER SCENE B SCENE SEQUENCE OF SCENES C, A, D, B, E (LATEST STATE) |

FIG. 3C

| VERSION NUMBER | EDITING HISTORY |
|---|---|
| ... | ... |
| 3 | SCENE SEQUENCE OF SCENES A, B, C, D, E |
| 4 | SCENE SEQUENCE OF SCENES C, A, B, D, E |
| ... | ... |
| 12 | SCENE SEQUENCE OF SCENES C, A, D, B, E |

FIG. 4A

| SCENE | SCENE A | SCENE B | SCENE C | SCENE D | SCENE E |
|---|---|---|---|---|---|
| REPRODUCTION TIME LENGTH | 10 SECONDS | 20 SECONDS | 10 SECONDS | 20 SECONDS | 30 SECONDS |

FIG. 4B

| SCENE ID | SCENE A | SCENE B | SCENE C | SCENE D | SCENE E |
|---|---|---|---|---|---|
| SCENE LENGTH | 1000 FRAMES | 2000 FRAMES | 1000 FRAMES | 2000 FRAMES | 3000 FRAMES |

REPRODUCTION APPARATUS AND REPRODUCTION METHOD

BACKGROUND OF THE INVENTION

1. Field of the Invention

The present invention relates to a reproduction apparatus and a reproduction method, and, in particular, to a technique which is suitably used to reproduce a moving image from a specific position.

2. Description of the Related Art

In recent years, it has become possible to reproduce moving images in various environments. In a case where a user starts watching a moving image, reproduction of the moving image is generally started from the head thereof. Here, each of Japanese Patent Application Laid-Open Nos. 2001-069487 and 2006-013792 discloses a technique of reproducing a moving image from the middle by using information including specific position information indicating a specific position of the moving image from which the reproduction is started.

Further, in a case where a moving image is edited, data which concerns the moving image and was used before the moving image is edited cannot be used because its consistency is lost. Consequently, Japanese Patent Application Laid-Open No. 2002-351878 discloses a technique of maintaining consistency of data even after editing of a moving image, by previously embedding information enabling to restore the data in each frame of the moving image.

However, in the technique disclosed in each of Japanese Patent Application Laid-Open Nos. 2001-069487 and 2006-013792, as described above, if the moving image after the editing is reproduced from the middle by using the information indicating the reproduction start position generated before the editing, there is a problem that the moving image is reproduced from an unintended position which is different from the reproduction start position intended before the editing.

Further, in the technique disclosed in Japanese Patent Application Laid-Open No. 2002-351878, although the moving image after the editing can be restored so as to be in the state same as that before the editing, there is a problem that a user oneself has to select the reproduction start position to reproduce the moving image from the middle. Moreover, if history information is used to reproduce the moving image in such a case, there is a problem that a capacity of the moving image increases in proportion to the number of times of the editing.

The present invention, which has been completed in consideration of the above problems, intends to be able to reproduce the moving image generated after the editing from the middle as well as the moving image generated before the editing, by using the information for reproducing, from the middle, the moving image generated before the editing.

SUMMARY OF THE INVENTION

To achieve such a problem as described above, in the present invention, a reproduction apparatus, which reproduces a moving image recorded in a recording apparatus, is characterized by comprising: a storage unit configured to store change information indicating a change of a position of a scene included in the moving image recorded in the recording apparatus; a receiving unit configured to receive start information designating a reproduction start position of the moving image based on a reference position of the moving image before the change of the position of the scene; and an identifying unit configured to identify a distance from the reference position to the reproduction start position changed by the change of the position of the scene, on the basis of the change information and the start information received by the receiving unit.

Further features of the present invention will become apparent from the following description of exemplary embodiments with reference to the attached drawings.

BRIEF DESCRIPTION OF THE DRAWINGS

FIGS. 3A, 3B and 3C are diagrams illustrating examples of history tables according to first, second and third embodiments of the present invention, respectively.

FIGS. 4A and 4B are diagrams illustrating examples of scene tables according to the first and second embodiments of the present invention, respectively.

DESCRIPTION OF THE EMBODIMENTS

Hereinafter, preferred embodiments of the present invention will be described in detail with reference to the accompanying drawings. Incidentally, it should be noted that constitutions described in the following embodiments are merely equivalent to examples, and the present invention is not limited to the described embodiments.

<First Embodiment>

Figure 1:
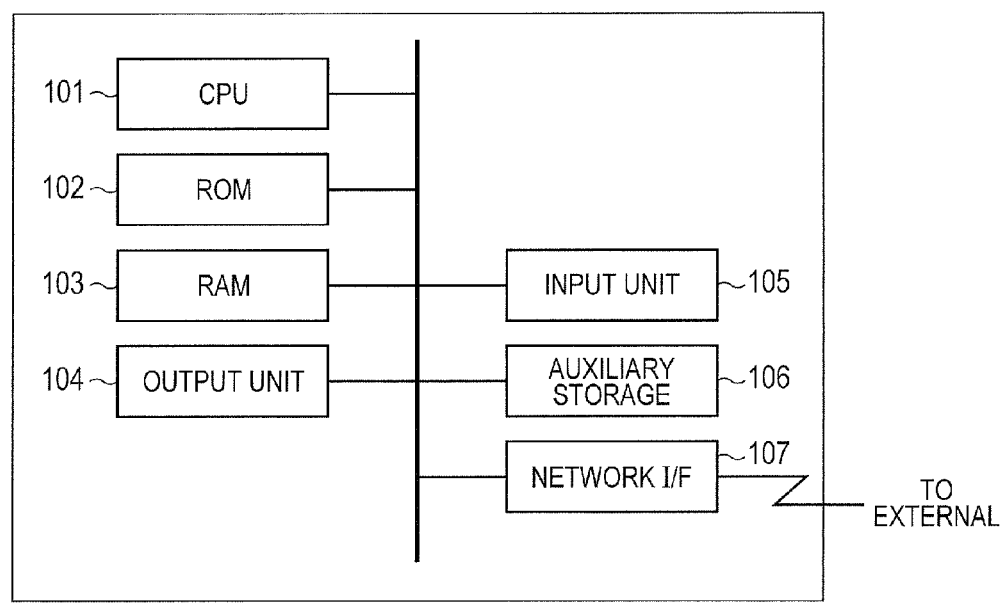
FIG. 1 is a block diagram illustrating an overall constitution of a reproduction apparatus.

FIG. 1 is a block diagram illustrating an example of a hardware constitution of a reproduction apparatus according to the first embodiment of the present invention. A CPU (central processing unit) 101, which is constituted by a microprocessor and the like, controls the whole reproduction apparatus. A ROM (read only memory) 102 stores therein programs and the like, and a RAM (random access memory) 103 stores therein the running program and also temporarily stores data and the like used for the running program.

An auxiliary storage 106, which is used to store a program, data and the like, is constituted by a hard disk and the like. An output unit 104, which is constituted by a display, a printer and the like, outputs information. An input unit 105, which is constituted by a keyboard, a mouse, buttons, a touch display, a camera, a bar code scanner and the like, inputs and/or receives information. A network I/F (interface) 107 is used to connect with an external device.

Figure 2:
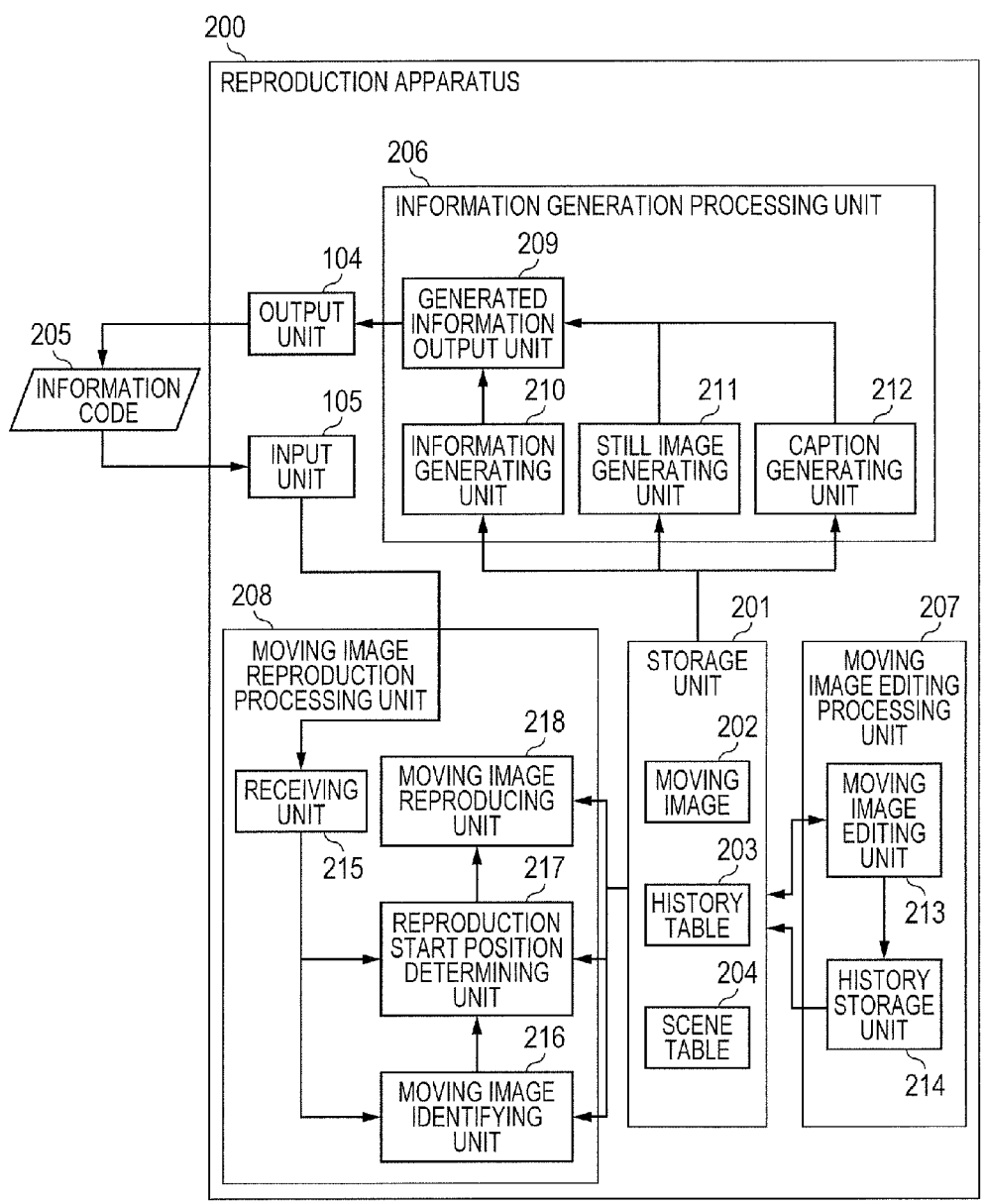
FIG. 2 is a block diagram illustrating function blocks of the reproduction apparatus.
Figure 5:
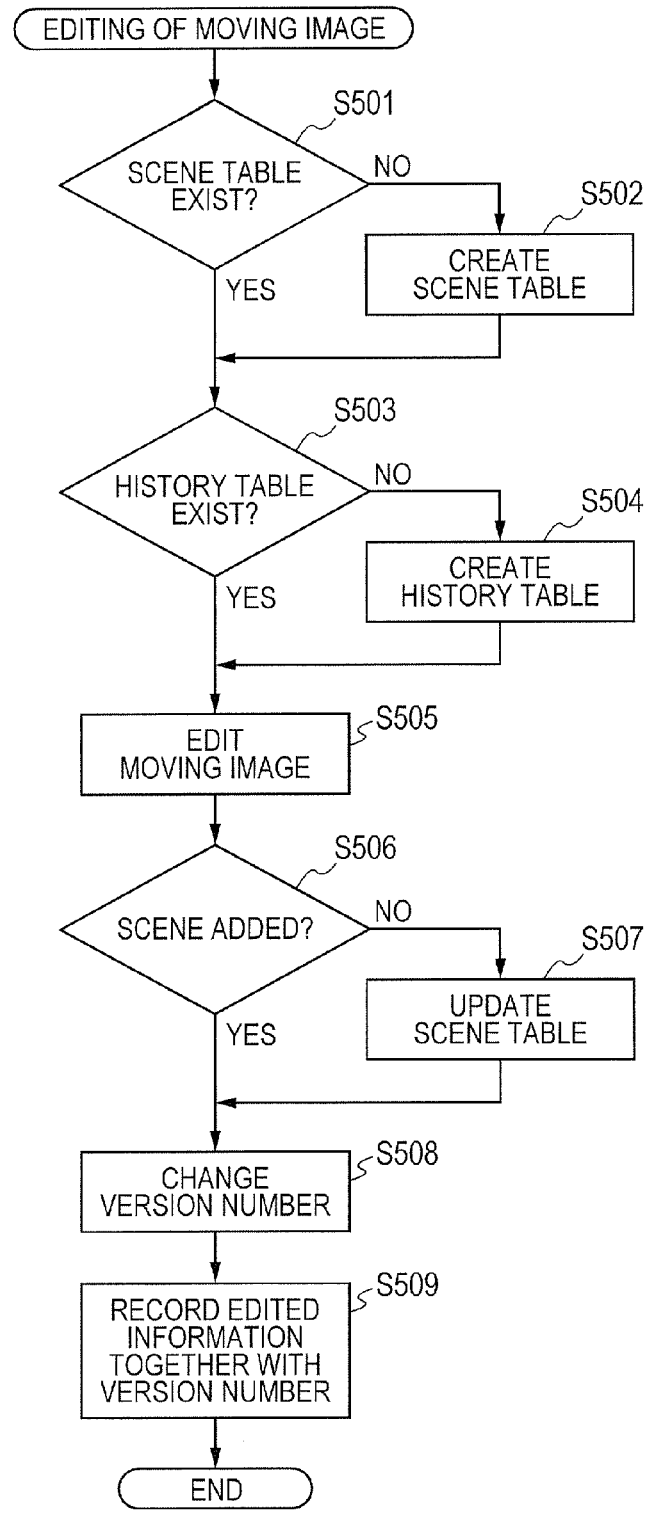
FIG. 5 is a flow chart illustrating an example of an editing process of a moving image according to the first embodiment of the present invention.

FIG. 2 is a block diagram illustrating an example of a functional constitution of the reproduction apparatus according to the present embodiment. Incidentally, it should be noted that the reproduction apparatus illustrated in FIG. 1 corresponds to a reproduction apparatus 200 illustrated in FIG. 2. The reproduction apparatus 200 includes an information generation processing unit 206, a moving image editing processing unit 207, a moving image reproduction processing unit 208 and a storage unit 201.

Here, each function of the reproduction apparatus 200 is achieved when the corresponding program read from the ROM 102 or the like is executed by the CPU 101.

The storage unit 201 records and reads the data used in the reproduction apparatus 200 to and from the auxiliary storage 106 and/or the RAM 103. The storage unit 201 treats data such as a moving image 202, a history table 203, a scene table 204 and the like. Here, the moving image 202, which is a moving image to be reproduced, is stored in the storage unit 201. The moving image 202 is composed of one or more scenes, the scene is equivalent to a moving image interval from a certain start point to a certain termination point in the moving image, and each scene includes an inherent scene identifier.

The scene serves as an editing unit when the moving image is edited. In the present embodiment, the editing implies operations of moving the position of the scene constituting the moving image, inserting the scene, and deleting the scene. Further, the moving image 202 may include history identification information. Here, the history identification information is an identifier capable of identifying the moving image 202 at a certain point. In the present embodiment, it is assumed that the history identification information is equivalent to a version number. Here, the version number is a value which is changed every time the moving image 202 is edited.

The history table 203 is a table on which a history of operations of associating the history identification information of the moving image 202 and change information of the moving image 202 with each other has been recorded (this table is created in a first storing process to be performed in regard to a first storage medium). Here, the change information is information indicating how the moving image 202 has been edited. FIG. 3A is a diagram illustrating an example of the history table 203. In FIG. 3A, the version number is used as the history identification information, and an editing history is used as the change information.

The scene table 204 is a table on which the scene identifier of each scene constituting the moving image 202 and one or a plurality of scene reproduction time lengths have been associated with each other and recorded (this table is created in a second storing process to be performed in regard to a second storage medium).

FIG. 4A is a diagram illustrating an example of the scene table 204. FIG. 4A particularly illustrates a case where the moving image 202 is constituted by five scenes of a scene A, a scene B, a scene C, a scene D and a scene E. Here, the upper row of the table indicates the scene identifier, and the lower row of the table indicates the reproduction time length of the scene indicated by the scene identifier. For example, FIG. 4A shows that the reproduction time length of the scene A is 10 seconds. Likewise, each of other scenes is recoded as a set of the scene and the reproduction time length.

Information code 205 is an identifier such as a bar code or the like, which includes a moving image identifier indicating the moving image 202 to be reproduced, identification information for identifying one of the history identification information, and start information of the moving image 202. Here, it should be noted that the moving image identifier has a unique value which is not changed even if the moving image 202 is edited. The start information is reproduction start position information capable of identifying the frame from which the reproduction of the moving image 202 is started.

In the present embodiment, if the moving image 202 is reproduced from its head, a reproduction start position is equivalent to a time which elapses up to the frame from which a user intends to start the reproduction of the moving image. For example, if the reproduction start position of the moving image 202 is 30 seconds, the reproduction of the moving image 202 is started from the frame which is at a 30-second point from the head of the moving image.

Further, the information code 205 may include termination information of the moving image 202. Here, the termination information is reproduction termination position information capable of identifying the frame at which the reproduction of the moving image 202 is terminated. In the present embodiment, if the moving image 202 is reproduced from its head, a reproduction termination position is equivalent to a time which elapses from the head up to the frame at which a user intends to terminate the reproduction of the moving image. Alternatively, if the moving image 202 is reproduced from the reproduction start position, the reproduction termination position is equivalent to a time which elapses from the reproduction start position up to the frame at which a user intends to terminate reproduction of the moving image. In any case, it is possible by using the start information and the termination information to reproduce a specific range of the moving image 202.

In the present embodiment, the form of the information code 205 is not limited to the bar code. Namely, it is possible to use any form such as a two-dimensional code, a still image in which information has been embedded, an RF (radio frequency) tag, a URI (Uniform Resource Identifier) character string or the like which can be interpreted by the reproduction apparatus 200 with use of an appropriate input method. In the reproduction apparatus 200, the information code 205 is output by the output unit 104 and input from the input unit 105.

The information generation processing unit 206 includes an information generating unit 210 and a generated information output unit 209. The information generating unit 210 obtains, from the moving image 202 to be reproduced, the moving image identifier indicating the moving image 202 and one of the version numbers of the moving image 202 as the identification information, and generates the reproduction start position information of the moving image 202 in the relevant version.

The generated information output unit 209 receives the information from the information generating unit 210, and outputs the received information as the information code 205 to an appropriate medium such as a paper, a display or the like through the output unit 104. Further, the information generation processing unit 206 may include a still image generating unit 211 which generates such a still image as representing a scene content of the moving image 202. In this case, the generated information output unit 209 also outputs the still image, received from the still image generating unit 211, to an appropriate medium through the output unit 104.

Further, the information generation processing unit 206 may include a caption generating unit 212 which generates such a caption as representing a scene content. In this case, the generated information output unit 209 also outputs the caption, received from the caption generating unit 212, to an appropriate medium through the output unit 104.

The moving image editing processing unit 207 includes a moving image editing unit 213 and a history storage unit 214. The moving image editing unit 213 edits the moving image 202, and transfers change information based on the editing to the history storage unit 214. Incidentally, with respect to each of the scenes constituting the moving image 202, the scene identifier indicating the scene and the reproduction time length of the scene are associated with each other and recorded on the scene table 204.

The history storage unit 214 records, on the history table 203, the change information together with the history identification information of the moving image 202. The moving image reproduction processing unit 208 includes a receiving unit 215, a moving image identifying unit 216, a reproduction start position determining unit 217 and a moving image reproducing unit 218. The receiving unit 215 obtains, from the information code 205 input from the input unit 105, the moving image identifier indicating the moving image 202, the version number serving as the history identification information, and the reproduction start position information of the moving image 202 in the version identified based on the version number. Then, the receiving unit 215 transfers the moving image identifier and the version number (version information) to the moving image identifying unit 216, and also transfers the moving image identifier and the reproduction start position information to the reproduction start position determining unit 217.

The moving image identifying unit 216 constructs a sequence of the scenes of the moving image 202 identified by the version number, by referring to the history table 203, and then notifies the reproduction start position determining unit 217 of the constructed sequence. In any case, a detailed process flow of this operation will be described later.

The reproduction start position determining unit 217 determines the reproduction start position in the current moving image 202, by referring to the sequence of the scenes constructed by the moving image identifying unit 216 and the scene table 204, and then notifies the moving image reproducing unit of the determined reproduction start position. Subsequently, the moving image reproducing unit 218 reproduces the moving image 202 from the reproduction start position determined by the reproduction start position determining unit 217. In a case where also the reproduction termination position information is obtained from the information code, the reproduction termination position in the current moving image 202 may be determined in the same manner as that of determining the reproduction start position, and thus the moving image 202 may be reproduced from the moving image reproduction start position to the moving image reproduction termination position.

The above functional constitution may be achieved by a single reproduction apparatus, or, alternatively, the above functional constitution may be divided and then achieved respectively by a plurality of apparatuses according to need. Further, data such as the moving image 202 may be divided and disposed respectively to different devices. In a case where the above functional constitution is achieved by a plurality of devices, these devices are mutually connected communicably by a computer network such as a LAN (local area network) or the like.

Subsequently, processing flows in the present embodiment will be described with reference to respective flow charts illustrated in FIGS. 5, 6, 7 and 11. Initially, an example of the process of the moving image editing processing unit 207 for editing the moving image 202 in the present embodiment will be described with reference to the flow chart illustrated in FIG. 5.

First, in S501, the moving image editing unit 213 confirms whether or not the scene table 204 for the moving image 202 exists. If the scene table 204 does not exist, in S502, the moving image editing unit 213 obtains the scene identifier indicating each of the scenes constituting the moving image 202 and the reproduction time length of the corresponding scene, creates the scene table 204 for the moving image 202, and then records the obtained scene identifier and the reproduction time length on the crated table. Alternatively, the moving image editing unit 213 divides the moving image 202 into the plurality of scenes, allocates the scene identifier to each of the divided scenes, creates the scene table 204 for the moving image 202, and then records the allocated scene identifier together with the corresponding reproduction time length on the created table.

In S503, the moving image editing unit 213 confirms whether or not the history table 203 corresponding to the moving image 202 exists. If the history table 203 does not exist, in S504, the moving image editing unit 213 newly creates the history table 203. Here, as illustrated in FIG. 3A, the first version number "1" and a sequence order (or sorting order) of the scenes constituting the moving image 202 at this moment are associated and recorded on the table.

Next, in S505, the moving image editing unit 213 edits the moving image 202. Further, the moving image editing unit 213 temporarily stores therein the change information being the edited content of the moving image 202. Incidentally, if a new scene is added in the editing in S505, the scene table is updated (S506, S507).

Next, in S508, the moving image editing unit 213 changes the version number of the edited moving image 202, and notifies the history storage unit 214 of the change information and the changed version number. Finally, in S509, the history storage unit 214 associates the change information and the version information with each other, and records them on the history table 203.

Figure 8:
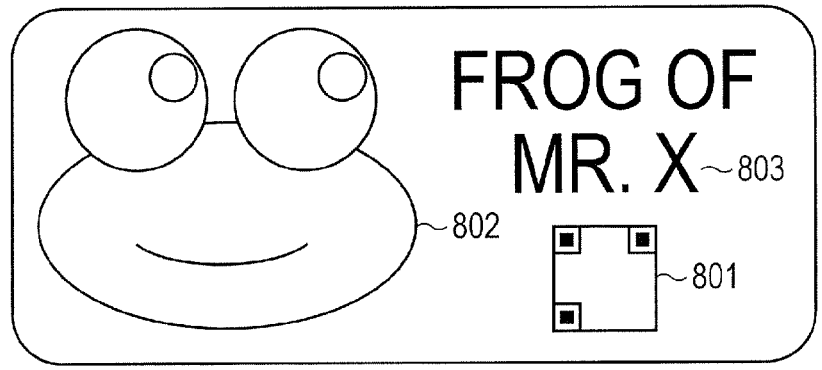
FIG. 8 is a diagram illustrating an example of reproduction information to be output by an information generation processing unit 206.

Then, an example of the process of the information generation processing unit 206 for generating reproduction information of the moving image 202 in the present embodiment will be described. Here, the reproduction information is information to be used to reproduce the moving image 202 from a designated reproduction start position. FIG. 8 illustrates an example of the reproduction information which has been output on a paper. More specifically, the reproduction information includes an information code 801. Moreover, the reproduction information may include a still image (thumbnail) 802 indicating the scene content of the moving image 202 to be reproduced, a caption 803 indicating the scene content, and the like. The still image 802 and the caption 803 are used to help a person to understand the meaning of the information code 801. Incidentally, the information code 801 in FIG. 8 corresponds to the information code 205 in FIG. 2.

First, the information generating unit 210 generates the information code 205. Besides, the information generating unit 210 obtains the moving image identifier and the version number of the moving image 202 to be reproduced, determines the reproduction start position of the moving image 202, and then generates the information code 801 including the moving image identifier, the version number and the reproduction start position.

Next, if necessary, it is possible to perform a process of generating the thumbnail, and/or a process of generating the caption. The still image generating unit 211 generates the still image 802 indicating the scene content, and the caption generating unit 212 generates the caption 803 indicating the scene content.

Finally, the generated information output unit 209 outputs the information code 205, the still image 802 if the thumbnail has been generated, and the caption 803 if the caption has been generated, through the output unit 104.

Then, an example of the process of the moving image reproduction processing unit 208 for reproducing the moving image 202 in the present embodiment will be described with reference to the flow chart illustrated in FIG. 6. First, in S601, the receiving unit 215 reads the information code 205 through the input unit 105, and thus obtains the moving image identifier indicating the moving image 202, the version number, and the reproduction start position.

Next, in S602, the moving image identifying unit 216 receives the moving image identifier and the version number from the receiving unit 215, and identifies the sequence order of the scenes of the moving image 202 identified by the moving image identifier in the version identified by the version number, by referring to the history table 203.

Figure 7:
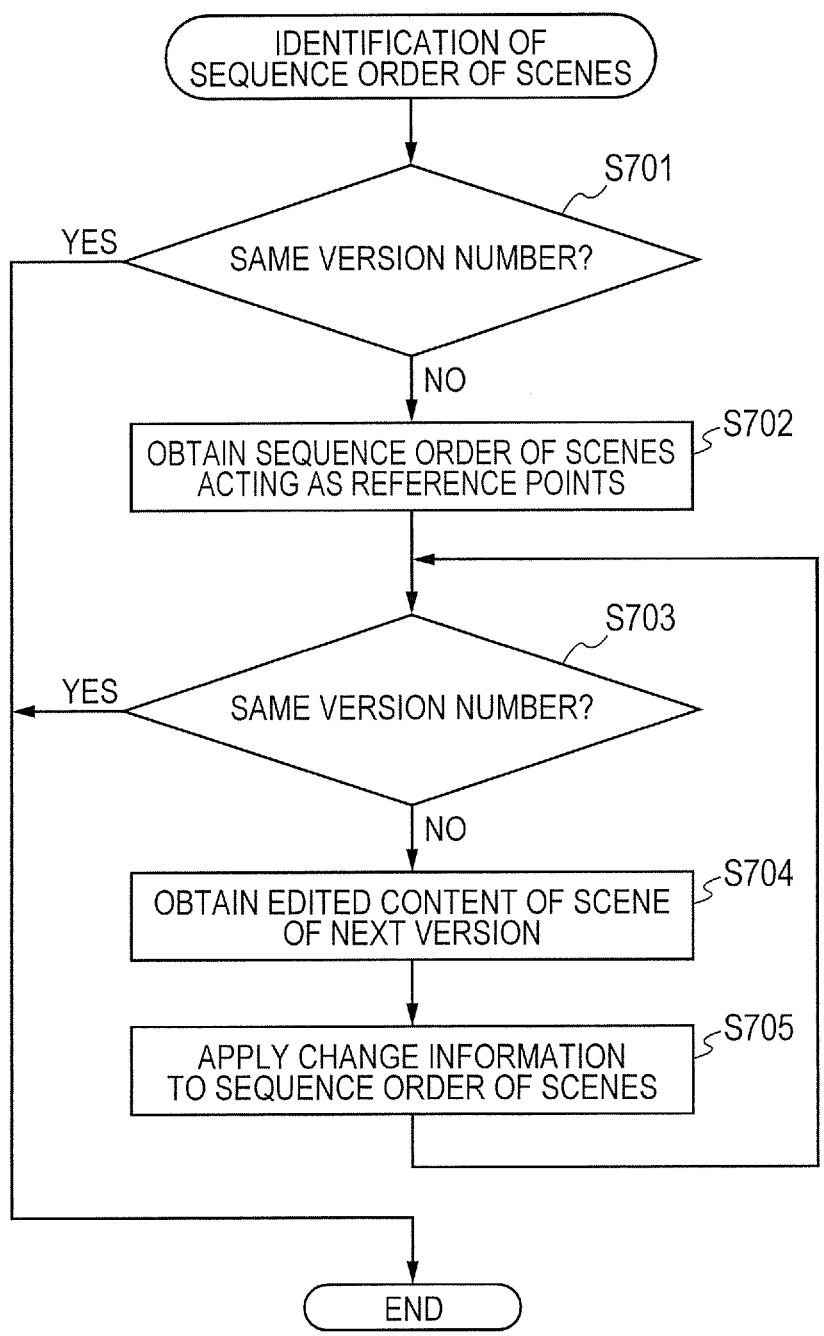
FIG. 7 is a flow chart illustrating an example of a scene sequence order identifying process to be performed in the reproduction process according to the first embodiment of the present invention.

Here, an example of the process of the moving image identifying unit 216, to be performed in S602, for identifying the sequence order of the scenes of the moving image 202 in the version identified by the version number will be described with reference to the flow chart illustrated in FIG. 7.

In S701, the version number may be compared in advance with the latest version number in the moving image 202 or on the history table 203. If these version numbers are the same, it is unnecessary to perform subsequent processes. This is because it turns out at this point that the moving image 202 is not edited after the information code 205 was generated. That is, it is apparent that the sequence of the scenes of the moving image 202 in the version number obtained from the information code 205 is the same as the sequence of the scenes of the current moving image 202. On the other hand, if these two version numbers are not the same, it turns out that the moving image 202 is edited after the information code 205 was generated.

Next, in S702, the moving image identifying unit 216 obtains the sequence of the scenes acting as reference points from the history table 203, and temporarily stores the obtained sequence. That is, in FIG. 3A, the sequence order of the scenes in an original state (in order of scenes A, B, C, D, E) which has been associated with the version 1 is obtained and temporarily stored.

Next, in S703, it is determined whether or not the version number obtained from the information code 205 and the version number obtained from the history table 203 are the same by comparing these version numbers with each other. Incidentally, if the determination in S701 was already performed, the determination in S703 may be skipped because the first determination in S703 certainly arrives at the result that these version numbers are not the same.

If it is determined in S703 that these version numbers are not the same, the process advances to S704. In this step, the change information which is the edited content of the scene corresponding to the next version number is obtained from the editing history information of the history table 203.

Next, in S705, the change information obtained from the history table 203 is applied to the temporarily stored sequence of the scenes.

Figure 9:
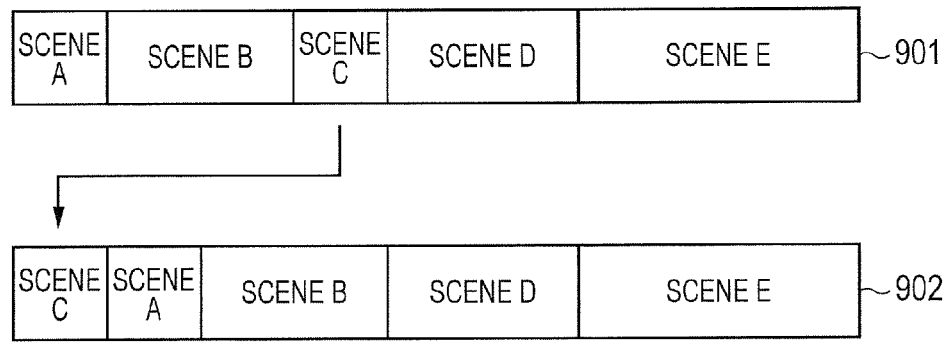
FIG. 9 is a diagram for illustrating a change of a sequence order of scenes.

An example of the process to be performed in S705 will be described with reference to FIG. 9. For example, in a case where a sequence 901 of scenes is a sequence of "SCENE A, SCENE B, SCENE C, SCENE D, SCENE E" and the change information indicates "place SCENE C at the head", a sequence 902 of scenes to which the change information has been applied is a sequence of "SCENE C, SCENE A, SCENE B, SCENE D, SCENE E". This sequence 902 is temporarily stored again, and the process returns to S703.

Then, if it is determined in S703 that the two version numbers are the same, the process of identifying the sequence order of the scenes is terminated.

Figure 6:
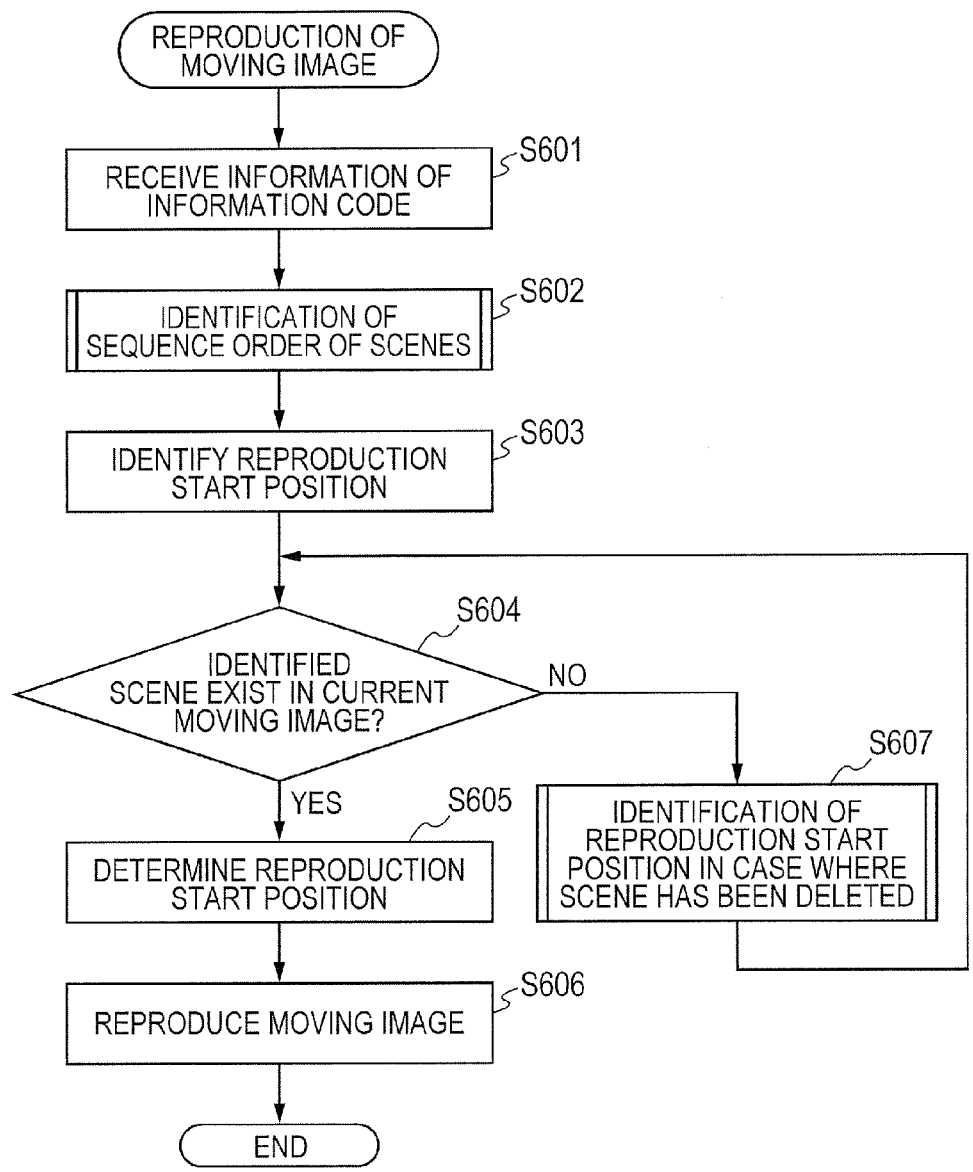
FIG. 6 is a flow chart illustrating an example of a reproduction process of the moving image according to the first embodiment of the present invention.

The description returns to FIG. 6. In S603, the reproduction start position determining unit 217 receives the moving image identifier and the reproduction start position information from the receiving unit 215, and further receives the constructed sequence order of the scenes from the moving image identifying unit 216. Then, with reference to the scene table 204 and the received sequence order of the scenes, the reproduction start position determining unit 217 performs a reproduction start scene identifying process of identifying which scene the reproduction start position corresponds to, and a reproduction start position identifying process of identifying which position in the scene the reproduction start position corresponds to.

Next, in S604, the reproduction start position determining unit 217 determines whether or not the scene in which the reproduction start position has been identified exists in the current moving image 202.

If it is determined in S604 that the scene in which the reproduction start position has been identified does not exist, the process advances to S607 to again identify the reproduction start position. Incidentally, the process of again identifying the reproduction start position to be performed in S607 will be described later. After the reproduction start position was identified again, it is again determined whether or not the scene in which the reproduction start position has been identified exists (S604).

If it is determined in S604 that the scene in which the reproduction start position has been identified exists, the process advances to S605. In this step, the reproduction start position determining unit 217 performs a reproduction start position determining process of determining the reproduction start position in the current moving image 202. Since which scene and which position the reproduction start position corresponds to have been identified in S603, the reproduction start position in the current moving image 202 can be determined by applying the specified scene and position to the sequence of the scenes of the current moving image 202.

Finally, in S606, the moving image reproducing unit 218 reproduces the moving image 202 indicated by the moving image identifier, from the reproduction start position determined by the reproduction start position determining unit.

Figure 10:
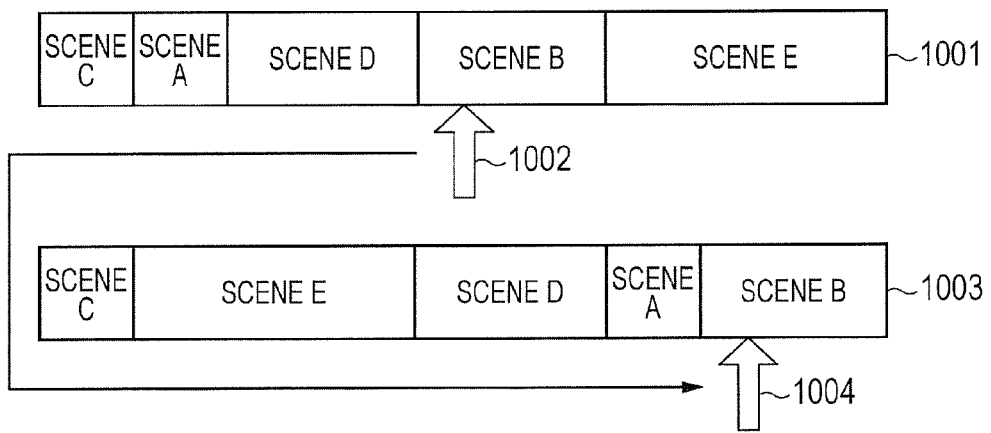
FIG. 10 is a diagram illustrating correspondence between a reproduction start position in video data before editing and a reproduction start position in the video data after the editing.
Figure 11:
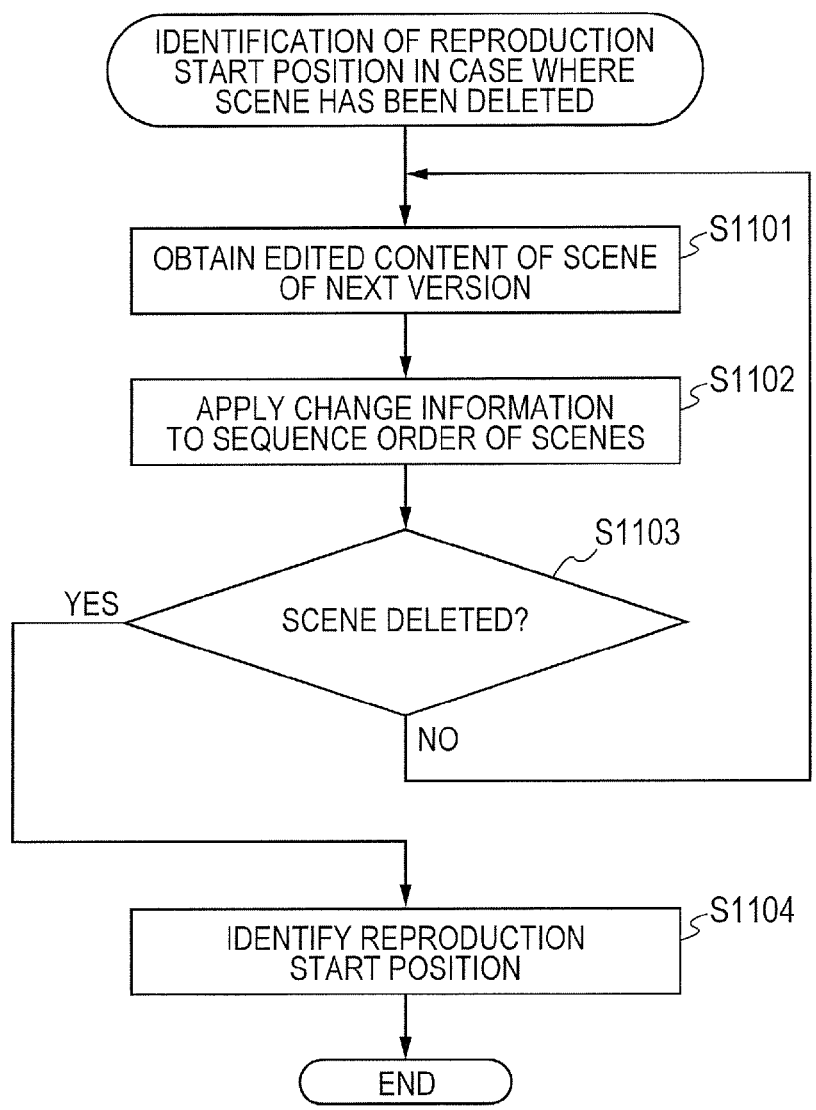
FIG. 11 is a flow chart illustrating a reproduction start position identifying process in a case where a designated scene has been deleted.

Next, the reproduction start position identifying process (S603) and the reproduction start position determining process (S605) to be performed by the reproduction start position determining unit 217 by using, e.g., the scene table 204 illustrated in FIG. 4A will be described with reference to FIG. 10.

For example, it is assumed that the reproduction start position information received by the reproduction start position determining unit 217 from the receiving unit 215 indicates "45 seconds", and that a sequence order 1001 of the scenes constructed by the moving image identifying unit 216 is "SCENE C, SCENE A, SCENE D, SCENE B, SCENE E".

In this case, the reproduction time lengths of the respective scenes are sequentially obtained from the scene table 204. Here, the reproduction time lengths of the scenes C and A are respectively 10 seconds and the reproduction time length of the scene D is 20 seconds, whereby the total reproduction time lengths so far is 40 seconds. The reproduction time length of the next scene B is 20 seconds. Therefore, since the reproduction start position information indicates "45 seconds", it is possible to identify that the reproduction start position information indicates a position 1002 at five seconds from the start of the scene B.

A sequence order 1003 of the current moving image 202 can be get from the moving image 202 itself. Here, it is assumed that the sequence order 1003 of the scenes of the current moving image 202 is "SCENE C, SCENE E, SCENE D, SCENE A, SCENE B". In this case, it is understood that the start point of the scene B identified in the previous process is at the position of 70 seconds in the whole of the current moving image 202 (reproduction start scene position information). The point (position) at five seconds from the start of the scene B corresponds to a position 1004 of 75 seconds in the whole of the current moving image 202, and this position can be determined as the reproduction start position.

Although it has been identified in which scene the reproduction start position exists in S603 of FIG. 6, there is a case where the scene does not already exist in the current moving image 202. If it is determined in S604 that the scene in which the reproduction start position has been identified does not exist, the moving image identifying unit 216 and the reproduction start position determining unit 217 perform the process (S607) of identifying the reproduction start position in the case where the scene has been deleted. In any case, an example of the process (S607) of identifying the reproduction start position will be described with reference to the flow chart illustrated in FIG. 11.

In S1101, the moving image identifying unit 216 restarts the process of identifying the sequence order of the scenes, which has been partially performed. First, the moving image identifying unit 216 obtains the change information which is the edited content of the scene corresponding to the next version number, from the editing history information of the history table 203.

Next, in S1102, the moving image identifying unit 216 applies the change information obtained from the history table 203, to the temporarily stored sequence of the scenes.

Next, in S1103, it is determined whether or not the scene in which the reproduction start position has been identified is deleted. Then, the process advances to S1104 if it is determined that the scene is deleted, while the process returns to S1101 if it is determined that the scene is not deleted yet.

In S1104, the reproduction start position at the head of the scene subsequent to the above scene. Here, if there is no scene subsequent to the above scene, the reproduction start position may be set to the previous scene of the above scene. In other words, the moving image identifying unit performs a scene determining process of determining a scene adjacent to the deleted scene in the moving image at the point when the deleted scene existed.

When the reproduction start position is set at the new position, it is determined in S604 whether or not the scene to which the new reproduction start position was set has been deleted in the current moving image 202. Even if it is determined that the relevant scene has been deleted, it only has to again perform the processes of the flow chart illustrated in FIG. 11. On the other hand, if it is determined that the relevant scene is not deleted, the process advances to S605 to determine the reproduction start position in the current moving image, and then the process further advances to S606 to reproduce the moving image 202.

Figure 12:
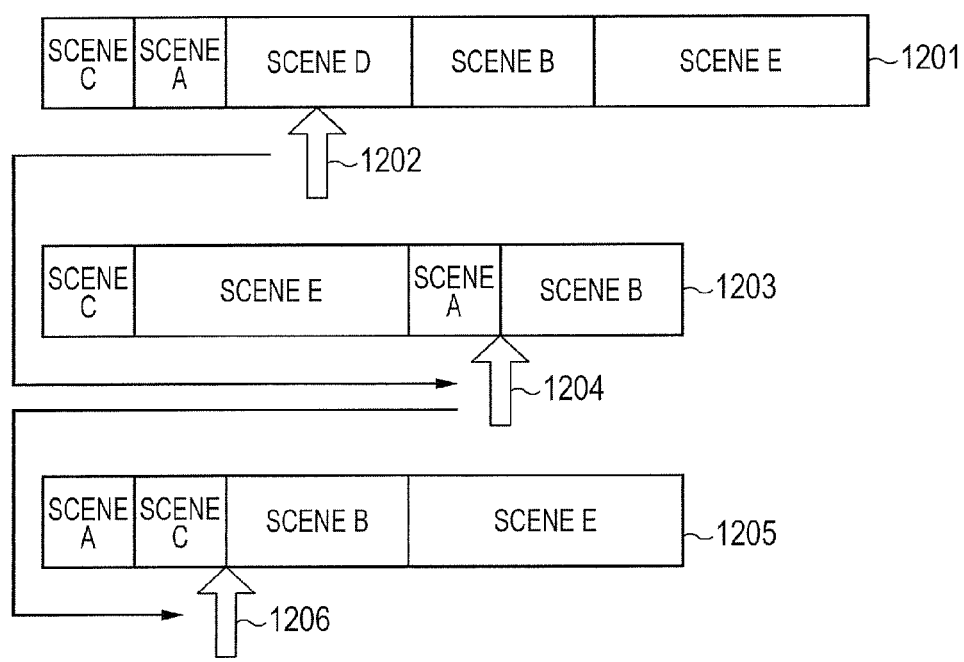
FIG. 12 is a diagram for illustrating the reproduction start position identifying process in the case where the designated scene has been deleted.

The above processes will be described concretely with reference to FIG. 12. For example, it is assumed that, as a result of the processes in S602 and S603, a reproduction start position 1202 in a sequence 1201 of the scenes of the moving image 202 constructed by the moving image identifying unit 216 could be identified as being on the way of the scene D. However, the scene D does not exist in a sequence order 1205 of the scenes of the current moving image 202. In this case, the moving image identifying unit 216 repeats the respective processes in S1101 to S1103 to obtain a sequence order 1203 of the scenes in the case where the scene D was deleted. Here, in the sequence order of the scenes immediately before the deletion of the scene D, when the scene subsequent to the scene D is the scene B, a reproduction start position 1204 is set at the head of the scene B. Finally, it is possible in S605 to determine a reproduction start position 1206 in the sequence order 1205 of the current scenes.

<Second Embodiment>

Hereinafter, the second embodiment of the present invention will be described. In the present embodiment, the descriptions of the parts which overlap those in the first embodiment will be omitted.

FIG. 3B is a diagram illustrating an example of a history table 203 to be used in the present embodiment. In the present embodiment, a date and time at which a moving image 202 was edited is used as history identification information, and editing history information is used as change information. However, unlike the first embodiment, a sequence order of scenes of the moving image 202 at the point when the history table 203 was created is not recorded.

FIG. 4B is a diagram illustrating an example of a scene table 204 to be used in the present embodiment. In the present embodiment, a scene identifier of each scene and the number of frames acting as a scene length of each scene are associated with each other and recorded, and the relevant scene length is treated as with the reproduction time length in the first embodiment. Besides, reproduction start position information does not represent a time but represents a frame number.

Figure 13:
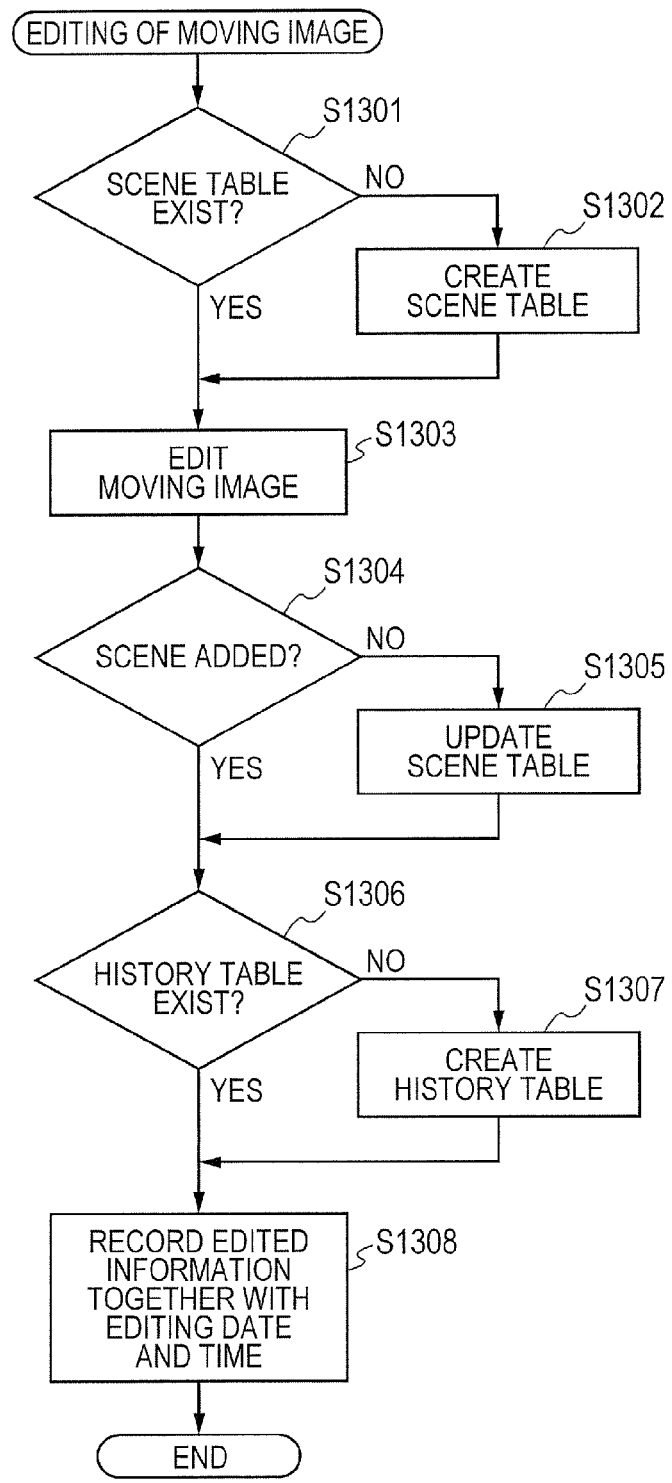
FIG. 13 is a flow chart illustrating an example of an editing process of a moving image according to the second embodiment of the present invention.

Subsequently, a processing flow in the present embodiment will be described. Initially, in the present embodiment, an example of the processing flow of a process of a moving image editing processing unit 207 for editing the moving image 202 will be described with reference to a flow chart illustrated in FIG. 13.

Here, processes in S1301 and S1302 are equivalent to those in S501 and S502 respectively. On the scene table 204 to be created, the scene identifier of each of the scenes constituting the moving image 202 and the scene length of the corresponding scene have been obtained and associated with each other. Since processes in S1303 to S1305 are the same as those in S505 to S507 respectively, the descriptions of these processes will be omitted.

Next, in S1306, a moving image editing unit 213 confirms whether or not the history table 203 corresponding to the moving image 202 exists. If the history table 203 does not exist, in S1307, the history table 203 for the moving image 202 is newly created.

Finally, in S1308, a history storage unit 214 associates the change information and the date and time with each other and records them on the history table 203.

In the present embodiment, processes of an information generation processing unit 206 for generating reproduction information of the moving image 202 are substantially the same as those described in the first embodiment. In the present embodiment, an information code 205 generated by an information generating unit 210 includes a moving image identifier of the moving image 202 to be reproduced, a date and time when the information code 205 was generated, and a reproduction start position (frame number) of the moving image 202. Here, a date and time when the moving image 202 was last edited may be used instead of the date and time when the information code 205 was generated.

Figure 14:
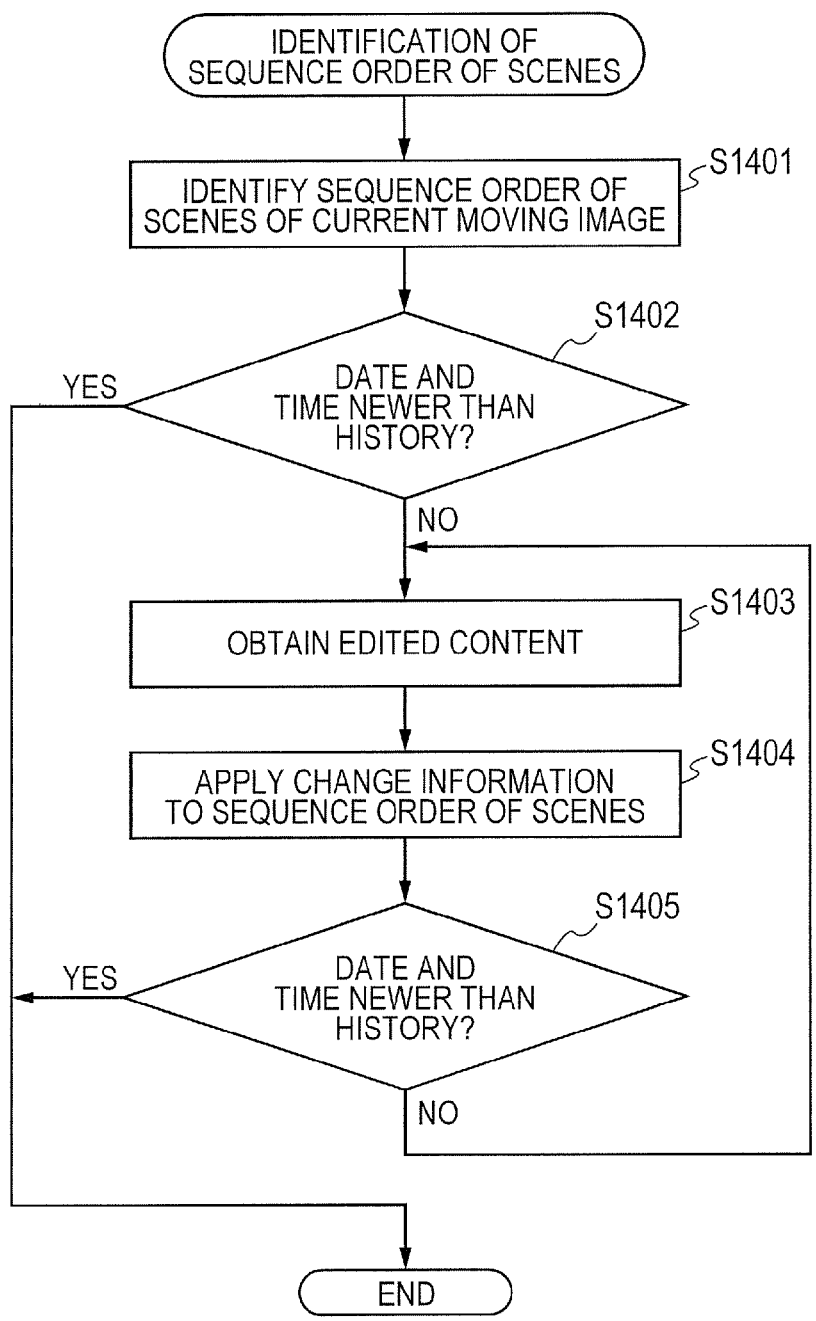
FIG. 14 is a flow chart illustrating an example of a scene sequence order identifying process to be performed in a reproduction process according to the second embodiment of the present invention.

In the present embodiment, processes of a moving image reproduction processing unit 208 for reproducing the moving image 202 are substantially the same as those described in the first embodiment (FIG. 6). Then, the process (S602) of identifying a sequence order of scenes will be described with reference to the flow chart illustrated in FIG. 14.

First, in S1401, a moving image identifying unit 216 obtains the sequence of the scenes of the current moving image 202, and temporarily stores them.

Next, in S1402, the moving image identifying unit 216 compares the date and time obtained from the information code 205 and a latest editing date and time stored in the history table 203 with each other. Then, if the date and time obtained from the information code 205 is newer than or the same as the latest editing date and time, subsequent processes are not performed. This is because, since the moving image 202 is not edited after the information code 205 was generated, it turns out at this point that the sequence order of the scenes is not changed.

Next, in S1403, the change information of one line being the edited content of the scene is obtained from the history table 203. In the first embodiment, the edited contents are obtained from the oldest. However, in the present embodiment, the edited contents are obtained from the newest.

Next, in S1404, the change information obtained from the history table 203 is applied to the temporarily stored sequence of the scenes.

Finally, in S1405, the date and time obtained from the information code 205 and the editing date and time of the editing history obtained from the history table 203 and applied in S1404 are compared with each other. Then, if the date and time obtained from the information code 205 is newer or the same, the process of identifying the sequence order of the scenes is terminated. On the other hand, if not, the process returns to S1403.

After then, a process of determining the reproduction start position and a process of reproducing the moving image 202 from the determined reproduction start position are respectively substantially the same as those in the first embodiment, although the reproduction start position is indicated not by the time but by the frame number. Therefore, the descriptions of these processes will be omitted.

As just described, according to the second embodiment, it is possible to identify the sequence order of the scenes by retracing the history information from the sequence order of the scenes of the current moving image 202, then determine the reproduction start position, and reproduce the moving image 202 from the point that a user desires.

<Third Embodiment>

Hereinafter, the third embodiment of the present invention will be described. In the present embodiment, the descriptions of the parts which overlap those in the first and second embodiments will be omitted.

In the present embodiment, although a broad flow of a process of a moving image editing processing unit 207 for editing a moving image 202 is substantially the same as those in the first and second embodiments (FIGS. 5 and 13), a process of recording change information in a history table 203 is different from the processes (S509, S1308).

FIG. 3C is a diagram illustrating an example of the history table 203 to be used in the present embodiment. In the first and second embodiments, the differences between the sequences of the scenes in the moving image 202 before the editing and the sequences of the scenes of the moving image 202 after the editing are recorded as the change information on the history table 203. However, in the present embodiment, a sequence order of scenes for each editing is recorded.

For example, it is assumed that the sequence of the scenes of the moving image 202 before editing is "SCENE A, SCENE B, SCENE C" and the sequence of the scenes of the moving image 202 after editing is "SCENE B, SCENE A, SCENE C". In this case, the change information such as "place SCENE B at the head", "move SCENE B behind SCENE A" and the like is recorded on the history table 203 in the first and second embodiments. On the other hand, in the present embodiment, the sequence order of the scenes of the moving image 202 such as "in order of SCENE B, SCENE A, SCENE C" or the like is recorded as it is on the history table 203 as the change information corresponding to the moving image 202 after the editing.

Subsequently, in the process of reproducing the moving image 202 in the first and second embodiments (FIG. 6), a process of a moving image reproduction processing unit 208 for identifying the sequence order of the scenes (S602) will be described.

A moving image identifying unit 216 obtains, from the history table 203, change information corresponding to history identification information obtained from an information code 205. Since the sequence order as described above has been recorded on the history table 203 in the present embodiment, the moving image identifying unit 216 stores the information obtained as the sequence order of the scenes, and the process of identifying the sequence order of the scenes is terminated.

After then, since a process of determining a reproduction start position and a process of reproducing the moving image 202 from the determined reproduction start position are the same as those in the first and second embodiments, the descriptions of these processes will be omitted.

As just described, according to the third embodiment, it is possible to immediately identify the sequence order of the scenes from the history identification information and the history table 203, then determine the reproduction start position, and reproduce the moving image 202 from the point that a user desires.

<Fourth Embodiment>

Hereinafter, the fourth embodiment of the present invention will be described. In the present embodiment, the descriptions of the parts which overlap those in the first to third embodiments will be omitted.

In the present embodiment, in addition to such editing methods as described in the above embodiments, there is provided an editing method of changing the length of a scene itself by dividing one scene into a plurality of scenes, or deleting the head or the end of a certain scene. Hereinafter, a flow of an editing process in the present embodiment will be described.

Initially, a flow of a process of dividing one scene into a plurality of scenes in the present embodiment will be described. Here, it should be noted that this process is performed as an example of processes of a moving image editing unit 213 for editing a moving image 202 in the processes of FIGS. 5 and 13 (S505, S1303).

First, the moving image editing unit 213 selects an arbitrary place in the scene included in the moving image 202, and divides the relevant scene into two scenes one corresponding to the portion before the selected place and the other corresponding to the portion after the selected place.

Next, the divided two scenes are recorded respectively as new scenes on a scene table 204. For example, if a scene A having 40 seconds as the reproduction time length is divided into two scenes at the place of 10 seconds from the head of the scene A, two new scenes one having 10 seconds as the reproduction time length and the other having 30 seconds as the reproduction time length are obtained. Further, new identifiers such as scenes B and C are allocated respectively to the two new scenes, and these scenes are held at the location of the scene A instead of the scene A. Furthermore, the scenes B and C are recorded together with the respective reproduction time lengths on the scene table 204.

Subsequent processes are performed as with the processes in S506 and S1303 and their subsequent steps in the above embodiments. Further, in case of dividing the scene into three or more scenes, it is possible to do so by repeating the above processes of dividing the scene into the two scenes.

Subsequently, a flow of a process of deleting a part of one scene in the present embodiment will be described. Here, it should be noted that this process is performed as an example of a process of a moving image editing unit 213 for editing the moving image 202 in the processes of FIG. 5 (S505).

First, the moving image editing unit 213 selects an arbitrary place in the scene included in the moving image 202, deletes the portion before or after the selected place, and leaves the remaining portion as it is.

Next, the portion not deleted in the scene the part of which has been deleted is recorded as a new scene on the scene table 204.

For example, it is assumed that there is a scene D having 40 seconds as the reproduction time length. Here, if the portion at the place of 20 seconds from the head of the scene D and the subsequent portion are deleted, the remaining portion having 20 seconds as the reproduction time length is recorded as the new scene. Further, a new identifier such as a scene E is allocated to the new scene, this scene is held at the location of the scene D instead of the scene D, and the scene originally subsequent to the scene D becomes the scene newly subsequent to the new scene E. Furthermore, the scene E is recorded together with the reproduction time length of the scene E on the scene table 204. Subsequent processes are performed as with the processes in S506 and S1303 and their subsequent steps in the above embodiments.

Next, a method of identifying a reproduction start position in such a scene dividing process as described above will be described with reference to FIGS. 15A and 15B. It should be noted that this method corresponds to the process of S1104 in the above embodiment.

It is assumed that there is the reproduction start position in a scene A 1501 which is one of the scenes constituting the moving image. In a case where a moving image identifying unit 216 obtains change information of a scene corresponding to a next version number from a history table 203, when the scene A 1501 has been divided into a scene B and a scene C 1503, a new reproduction start position is set on either the scene B or the scene C.

The reproduction start position is set at the equivalent position in both a case where the scene A 1501 is reproduced from its head and a case where the scene B and the scene C 1503 are reproduced from their heads. Then, it is assumed that the reproduction time length of the scene A 1501 is 40 seconds, and this scene A is divided into the scene B having 10 seconds from its head and the scene C having 30 second subsequent to the scene B.

Figure 15A:
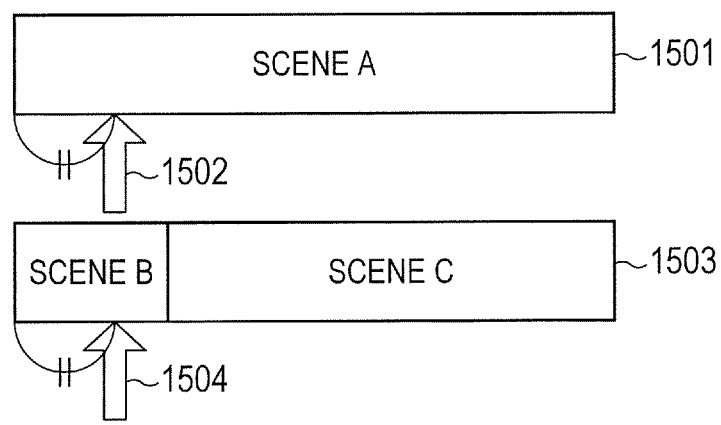
FIGS. 15A and 15B are diagrams for illustrating a reproduction start position identifying process in a case where a scene is divided.
Figure 15B:
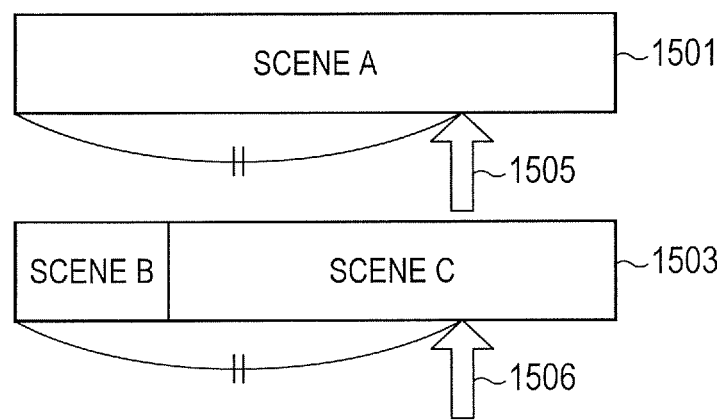

As illustrated in FIG. 15A, if it is assumed that a reproduction start position 1502 is at the point of five seconds from the head of the scene A, a reproduction start position 1504 after the division is set at the point of five seconds from the head of the scene B. Moreover, as illustrated in FIG. 15B, if it is assumed that a reproduction start position 1505 is at the point of 30 seconds from the head of the scene A, a reproduction start position 1506 after the division is set at the point of 20 seconds from the head of the scene C.

Figure 16A:
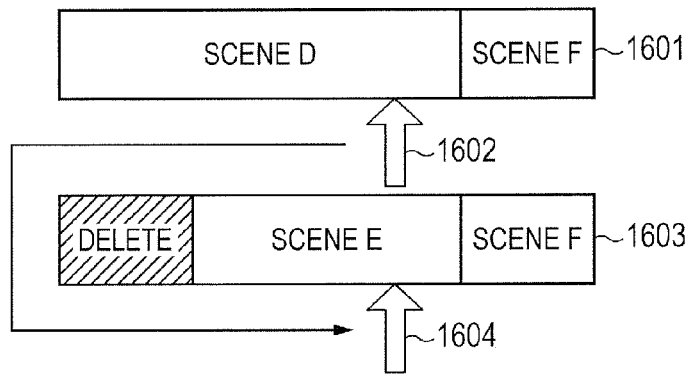
FIGS. 16A, 16B and 16C are diagrams for illustrating the reproduction start position identifying process in a case where the scene is deleted.

Next, a method of identifying a reproduction start position in such a process of deleting a part of the scene as described above will be described with reference to FIGS. 16A, 16B and 16C.

It is assumed that a scene D and a scene F are arranged in this order in a certain portion of the moving image as indicated by a constitution 1601 and there is a reproduction start position in the scene D. Moreover, it is assumed that, in a case where the moving image identifying unit 216 has obtained change information of a scene corresponding to a next version number from the history table 203, the scene D has been deleted partially and the portion not deleted remains as a scene E.

In this instance, a case where a reproduction start position 1602 is not set at the deleted portion will be first described. In this case, as indicated by a constitution 1603 in FIG. 16A, the reproduction start position 1602 is set at a position 1604 which is equivalent in both a case where the scene D is reproduced from its head and a case where the scene E including the deleted portion is reproduced from its head. However, if the reproduction start position is set in the deleted portion, this reproduction start position is shifted and set at another position.

Figure 16B:
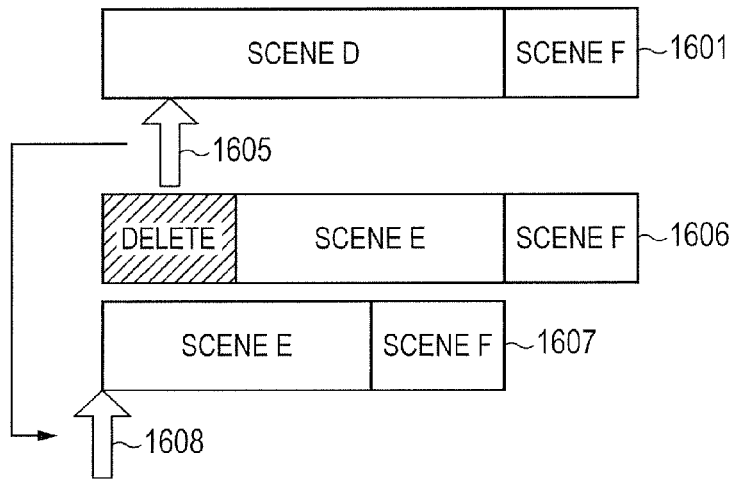

For example, as indicated by a constitution 1606 in FIG. 16B, if the head side of the scene D has been deleted and there is an identified reproduction start position 1605 in the deleted portion, then a new reproduction start position 1608 is set at the head of the scene E.

Figure 16C:
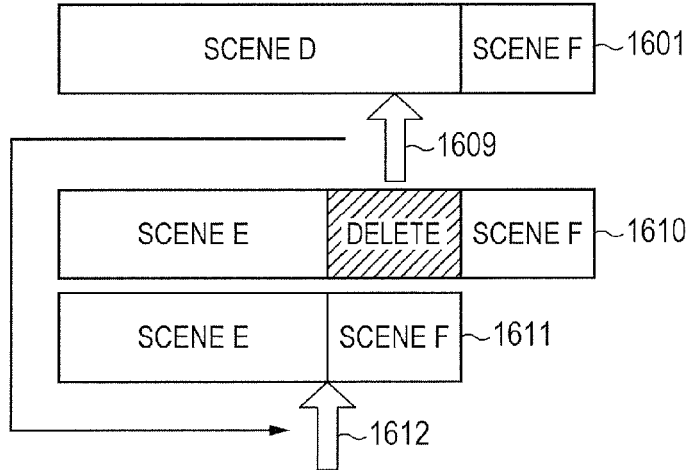

Further, as indicated by a constitution 1610 in FIG. 16C, a case where the end side of the scene D has been deleted and there is an identified reproduction start position 1609 in the deleted portion will be described. In this case, a new reproduction start position 1612 is set at the end of the scene E or at the head of the scene F existing subsequent to the scene D as indicated by a constitution 1611.

Although an editing method of dividing a certain scene into three or more scenes is conceivable as another editing method, this method can be achieved by repeating scene division. Further, although an editing method of partially deleting a halfway portion of a certain scene is conceivable as still another editing method, this method can be achieved by properly combining scene division and deletion of the head or the end of a scene. Therefore, descriptions of these methods will be omitted here.

<Other Embodiments>

The embodiments of the present invention have been described in detail as above. Here, it should be noted that the present invention can be achieved by properly combining the above embodiments. For example, it is possible to identify a sequence order of scenes in reverse chronological order on the history table 203 by using editing dates and times as history identification information, and reproduce a moving image by using a frame number as a reproduction start position.

It is possible according to the present invention to provide a moving image reproducing method which can reproduce a moving image after editing from the middle thereof, as well as a moving image before editing. Besides, by simultaneously providing the methods according to the present invention, the conventional method of reproducing a moving image from its head, a method of reproducing a moving image after editing as it is from a reproduction start position set before the editing of the moving image, and the like, it is possible to cause a user to select each of these methods.

The embodiments of the present invention can also be realized by a computer of a system or an apparatus that reads out and executes computer executable instructions recorded on a storage medium (e.g., a non-transitory computer-readable storage medium) to perform the functions of one or more of the above-described embodiments of the present invention, and by a method performed by the computer of the system or the apparatus by, for example, reading out and executing the computer executable instructions from the storage medium to perform the functions of one or more of the above-described embodiments. The computer may comprise one or more of a central processing unit (CPU), a micro processing unit (MPU) and another circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), storages of distributed computing systems, an optical disk (such as a compact disc (CD), a digital versatile disc (DVD), or a Blu-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053604, filed Mar. 9, 2012, which is hereby incorporated by reference herein in its entirety.

What is claimed is:

1. A reproduction apparatus which reproduces an editable moving image of a present version thereof comprising a sequence of scenes, wherein structures of editable moving images of a plurality of past versions thereof, comprising a different sequence of the scenes from the present version, are identified by edit history information recorded in a storage device, comprising:

an inputting unit configured to input identification information specifying the editable moving image of a specified past version of the plurality of past versions and start information designating a reproduction start position of the specified past version that is a start position measured from the beginning of the sequence of scenes of the specified past version; and an identifying unit configured
to identify one of the scenes that is included in a sequence of the scenes of the specified past version and includes the reproduction start position of the specified past version, based on the edit history information,
to identify a position in the one of the scenes corresponding to the reproduction start position of the specified past version, based on the edit history information, and
to identify a reproduction start position of the present version that is a position measured from the beginning of the sequence of scenes of the present version, based on the one of the scenes that includes the reproduction start position of the specified past version and the position in the one of the scenes corresponding to the reproduction start position of the specified past version for reproducing the editable moving image of the present version from the reproduction start position of the present version.

2. The reproduction apparatus according to claim 1, wherein
the length of scenes included in the editable moving images of past versions are identified by the edit history information recorded in the storage device, and
the identifying unit identifies the reproduction start position of the present version, on the basis of the length of the scenes identified by the edit history, the one of the scenes that includes the reproduction start position of the specified past version, and the position in the one of the scenes corresponding to the reproduction start position of the specified past version.

3. The reproduction apparatus according to claim 1, wherein in a case where the reproduction start position of the specified past version designates a position in one of a plurality of scenes deleted from the editable moving image of the past version, the identifying unit identifies a start position of a second scene in the editable moving image of the present version, which follows a first scene in the editable moving image of the specified past version, as the reproduction start position of the present version.

4. The reproduction apparatus according to claim 1, further comprising an output unit configured to output position information and an image associated with each other, wherein the position information indicates the reproduction start position of the specified past version, and the image is included in the editable moving image of the specified past version and corresponds to the position information.

5. The reproduction apparatus according to claim 1, wherein the edit history information includes information indicating a change of reproduction order of a plurality of scenes included in the editable moving image.

6. The reproduction apparatus according to claim 1, wherein the edit history information includes information indicating a date and time when a position of a scene included in the editable moving image was changed.

7. The reproduction apparatus according to claim 1, wherein the edit history information includes information indicating a version number of the editable moving image updated according to a change of a position of a scene included in the editable moving image.

8. The reproduction apparatus according to claim 1, wherein the start information includes information indicating a frame number of a position from which the reproduction of the editable moving image is started.

9. The reproduction apparatus according to claim 1, wherein the reproduction start position is counted from a head position of the editable moving image.

10. A reproduction method which reproduces an editable moving image of a present version thereof, comprising a sequence of scenes, wherein structures of editable moving images of a plurality of past version thereof, comprising a different sequence of scenes from the present version, are identified by edit history information recorded in a storage device, the reproduction method comprising:
   inputting identification information specifying the editable moving image of a specified past version of the plurality of past versions and start information designating a reproduction start position of the specified past version that is a start position measured from the beginning of the sequence of scenes of the specified past version;
   identifying one of the scenes that is included in a sequence of the scenes of the specified past version and includes the reproduction start position of the specified past version based on the edit history information;
   identifying a position in the one of the scenes corresponding to the reproduction start position of the specified past version based on the edit history information; and
   identifying a reproduction start position of the present version that is a position measured from the beginning of the sequence of scenes of the present version, based on the one of the scenes that includes the reproduction start position of the specified past version and the position in the one of the scenes corresponding to the reproduction start position of the specified past version for reproducing the editable moving image of the present version from the reproduction start position of the present version.

11. The reproduction method according to claim 10, wherein
   the length of scenes included in the editable moving images of the past versions are identified by the edit history information recorded in the storing device, and
   in the identifying step, the reproduction start position of the present version is identified on the basis of the stored length of the scenes identified by the edit history, the one of the scenes that includes the reproduction start position of the specified past version, and the position in the one of the scenes corresponding to the reproduction start position of the specified past version.

12. The reproduction method according to claim 10, wherein in a case where the reproduction start position of the specified past version designates a position in one of a plurality of scenes deleted from the editable moving image of the past version, a start position of a second scene in the editable moving image of the present version, which follows a first scene in the editable moving image of the specified past version, is identified in the identifying step as the reproduction start position of the present version.

13. The reproduction method according to claim 10, wherein the reproduction start position is counted from a head position of the editable moving image.

14. A non-transitory computer-readable storage medium which stores a program for causing a computer to execute a process of reproducing an editable moving image of a present version thereof, comprising a sequence of scenes, wherein structures of editable moving images of a plurality of past versions thereof, comprising a different sequence of scenes from the present version, are identified by edit history information recorded in a storage device, the process of the program comprising:
   an inputting step of inputting identification information specifying the editable moving image of a specified past version of the plurality of past versions and start information designating a reproduction start position of the specified past version that is a start position measured from the beginning of the sequence of scenes of the specified past version;
   an identifying step of identifying one of the scenes that is included in a sequence of the scenes of the specified past version and includes the reproduction start position of the specified past version based on the edit history information;
   an identifying step of identifying a position in the one of the scenes corresponding to the reproduction start position of the specified past version based on the edit history information; and
   an identifying step of identifying a reproduction start position of the present version that is a position measured from the beginning of the sequence of scenes of the present version, based on the one of the scenes that includes the reproduction start position of the specified past version and the position in the one of the scenes corresponding to the reproduction start position of the specified past version for reproducing the editable moving image of the present version from the reproduction start position of the present version.

15. The non-transitory computer-readable storage medium according to claim 14, wherein
   the length of scenes included in the editable moving images of the past versions are identified by the edit history information recorded in the storage device, and
   in the identifying step, the reproduction start position of the present version is identified on the basis of the stored length of the scenes identified by the edit history, one of the scenes that includes the reproduction start position of the specified past version, and the position in the one of the scenes corresponding to the reproduction start position of the specified past version.

16. The non-transitory computer-readable storage medium according to claim 14, wherein in a case where the reproduction start position of the specified past version designates a position in one of a plurality of scenes deleted from the editable moving image of the past version, a start position of a second scene in the editable moving image of the present version, which follows a first scene in the editable moving image of the specified past version, is identified in the identifying step as the reproduction start position of the present version.

17. The non-transitory computer-readable storage medium according to claim 14, wherein the reproduction start position is counted from a head position of the editable moving image.

* * * * *